Oct. 18, 1966 R. E. WILLIAMS 3,280,250

COLOR TELEVISION RECEIVER INCLUDING MEANS FOR SCANNING THE SAME HORIZONTAL LINES DURING CONSECUTIVE FIELDS

Filed June 1, 1962 4 Sheets-Sheet 1

INVENTOR
RICHARD E. WILLIAMS

BY Hurvitz and Rose

ATTORNEYS

INVENTOR
RICHARD E. WILLIAMS

BY Hurvitz and Rose
ATTORNEYS

INVENTOR
RICHARD E. WILLIAMS

BY Hurvitz & Rose

ATTORNEYS

INVENTOR
RICHARD E. WILLIAMS

BY Hurvitz & Rose

ATTORNEYS

United States Patent Office 3,280,250
Patented Oct. 18, 1966

3,280,250

COLOR TELEVISION RECEIVER INCLUDING MEANS FOR SCANNING THE SAME HORIZONTAL LINES DURING CONSECUTIVE FIELDS

Richard E. Williams, Fairfax, Va., assignor to Scope, Inc., Falls Church, Va., a corporation of New Hampshire
Filed June 1, 1962, Ser. No. 199,493
14 Claims. (Cl. 178—5.4)

The present invention relates generally to color television display devices and more particularly to a direct view cathode-ray-tube presentation system employing tricolor horizontal striae and synchronization circuits to derive full color presentation.

The present Federal Communications Commission's standards on color television transmission require that the chrominance information be supplied as sidebands on a 3.58 megacycle color subcarrier. The means of extracting phase and amplitude modulation components from the color subcarrier are well known and are presently exemplified in commercial color television receivers. At this time wide spread use is being made of the shadow mask cathode-ray-tube which uses a plurality of electron guns so as to obtain discrete optical centers for respective electron beams corresponding to the additive primary colors employed. Other display devices utilize post acceleration deflection schemes or some form of scan modulation so as to synchronize the cathode-ray electron beam color information to excitation of corresponding colored phosphors. The Philco "Apple" tube and the Lawrence Tricolor tube are examples of such approaches.

Since it is desirable for color television display systems to produce substantially unimpaired reproduction of black and white transmissions it is customary for the elemental resolution of the tricolor phosphors to be commensurate with that required for black and white transmissions employing video bandwidths in the order of 3 megacycles or so. Accordingly the shadow mask tube is typically supplied with 72,000 mask apertures (216,000 phosphor dots), the Apple tube provides about 300 triplets of vertical colored striae across the C.R.T. face, and the Lawrence tube provides similarly high phosphor resolution in the vertical dimension. Inadequate resolution produces color fringes in black and white presentations and produces a generally inferior black and white picture.

Present color television receiver practice restricts the bandwidth of each color component to approximately 600 kilocycles. The foveal, or high acuity, portion of the human retina is effectively color blind and it has long been realized that the eye cannot perceive color in fine detail. This gave rise to the present practice of "mixed highs" transmission and restricted color bandwidth. Such color bandwidths can be satisfied with display resolutions far poorer than those in the aforementioned color tubes. According to the Nyquist sampling theorum a 600 kilocycle bandwidth can accommodate 1.2 million bits of information per second. Since a horizontal line in present television practice encompasses an interval of approximately 60 microseconds it is seen that only about 70 bits of each color can be transmitted during a single horizontal sweep. From the *color* standpoint, therefore, it is merely necessary to quantize the display horizontally into about seventy regions, each capable of producing any desired color.

Present practice utilizes the three additive primaries— red, green, and blue. Each of the seventy regions must thus be able to produce any combination of the three primaries. From these theoretical observations, and taking into consideration the horizontal-to-vertical aspect ratio of 4 to 3 as is present practice, the vertical color resolution should consist of three-quarters of seventy regions or approximately fifty tricolor domains. As a practical matter, it has long been known that vertical resolution can be substantially inferior to horizontal resolution because of certain psychological characteristics of the human visual system. My experiments have shown that as few as thirty tricolor domains are generally acceptable and that eighty vertical domains produce almost no discernible quantification effects at normal viewing distance.

The present invention exploits this very acceptable relatively coarse vertical color resolution situation through the process of sampling each color approximately 88 times during each vertical sweep, pairing horizontal lines derived from successive fields, and viewing the resultant display through a mask or phosphor face-plate with approximately 75 properly registered horizontal striae. The difference between the 87 color samples and 75 striae is produced by unused samples occurring during the vertical blanking interval and during overlap at top and bottom of the cathode-ray-tube screen. The horizontal color resolution is arbitrarily high.

I am aware of the prior use of horizontal scanning receivers having horizontal striae indicative of the primary colors utilized in conjunction with the F.C.C. standard signal. These receivers, however, produced poor color pictures because of color crawl and the inability to obtain highly saturated colors. Both of these deficiencies resulted from the attempt to produce an interlaced field having a total of 525 lines. Such a large number of lines produced color desaturation since the cathode ray beam frequently could not be focused entirely within the desired striae. Color crawl resulted from color line reassignments by fields, needed to accommodate frames having of only odd lines in one field and even lines in the next field.

The present invention overcomes these disadvantages by pairing the same color lines in successive fields so that the number of separate color strips is reduced approximately in half, to 225. Similarly-numbered lines in successive fields therefore are not interlaced, but fall over each other so that highly saturated colors are obtained. Color crawling is eliminated since the color striae are spatially fixed.

Line pairing is accomplished by initiating the scan of each field in response to a combined vertical and horizontal sync pulse. The presence of the horizontal pulse assures that vertical scan initiation always has a fixed relationship to the horizontal scanning lines. Thus, lines in successive fields lie precisely over their preceding and following counterparts. With good focussing, the resulting horizontal lines are separated by dark spaces and thus can lie well within assigned color striae.

The registration of the mask or phosphor faceplate striae with the sampled color is readily accommodated through a simple registration procedure. Even in the absence of a color subcarrier it is possible to employ the output of a gate used in the color sampling circuit to produce, say, red striae throughout the field. The midpoint of the vertical sweep is clamped to a point established by a vertical positioning control. Registration is thus quickly effected at the center of the picture by adjustment of that control.

The red registration is then extended throughout the field from top to bottom by adjustments of the height and linearity controls. At the conclusion of the settings the registration switch is opened, enabling the system to work on the color subcarrier without additional alignment. Since the color striae are horizontal, parallax effects (applicable only in the case of a mask) are greater in the vertical than the horizontal direction. This is a very desirable situation since normal viewers are distributed over a much broader horizontal angle.

Through use of a mask which consists of transparent color striae the present invention converts readily to a black and white receiver of unimpaired quality. It is merely necessary to remove the mask and turn off the color circuits to attain excellent black and white presentations. Since the C.R.T. does not have a shadow mask or similar energy consuming element it works at relatively high efficiency and produces a bright picture with modest electron beam power consumption. I have found that a picture of improved color purity is obtained by overlapping adjacent horizontal color striae to a certain extent.

It is accordingly an object of the present invention to provide a new and improved color television receiver.

Another object of the invention is to provide an improved color television receiver employing horizontal parallel striae from which light rays of the primary colors are emitted.

A further object of the present invention is to provide a television receiver from which color or black and white images of excellent quality are derived.

It is an additional object of the invention to provide a novel color television display system in which approximately 75 horizontal striae each consisting of three primary colors are illuminated by appropriate chrominance signal information.

It is another object of the invention to provide a color synchronization system for color television which pairs horizontal lines of successive fields and assigns to triads of such pairs three additive primary colors in iterative sequence through a vertical sweep.

It is a further object of the invention to produce a color display system for television in which horizontal parallax is minimized through the use of vertical color sequencing techniques.

Still another object of the present invention is to provide a system for color display in which the color resolution is well matched to the human eye and bandwidth limitations of the transmission system.

Still another object of the invention is to provide a color television display utilizing a stationary mask interposed between the viewer's eye and a black and white cathode-ray-tube display device to convert the white phosphor excitation into full color displays.

Yet another object of the present invention is a color television synchronization system whose registration is attained through adjustment of low-energy controllable vertical-sweep circuits.

Still another object of the invention is a means for providing simple registration of sweep potentials on a cathode-ray-tube in a tricolor display faceplate or mask.

A further object of the present invention is to provide a new and improved mask for color television receivers.

The above and still further objects, features, and advantages of the present invention will become apparent upon consideration of the following detailed description of one specific embodiment thereof, especially when taken in conjunction with the accompanying drawings, wherein.

Figure 1:
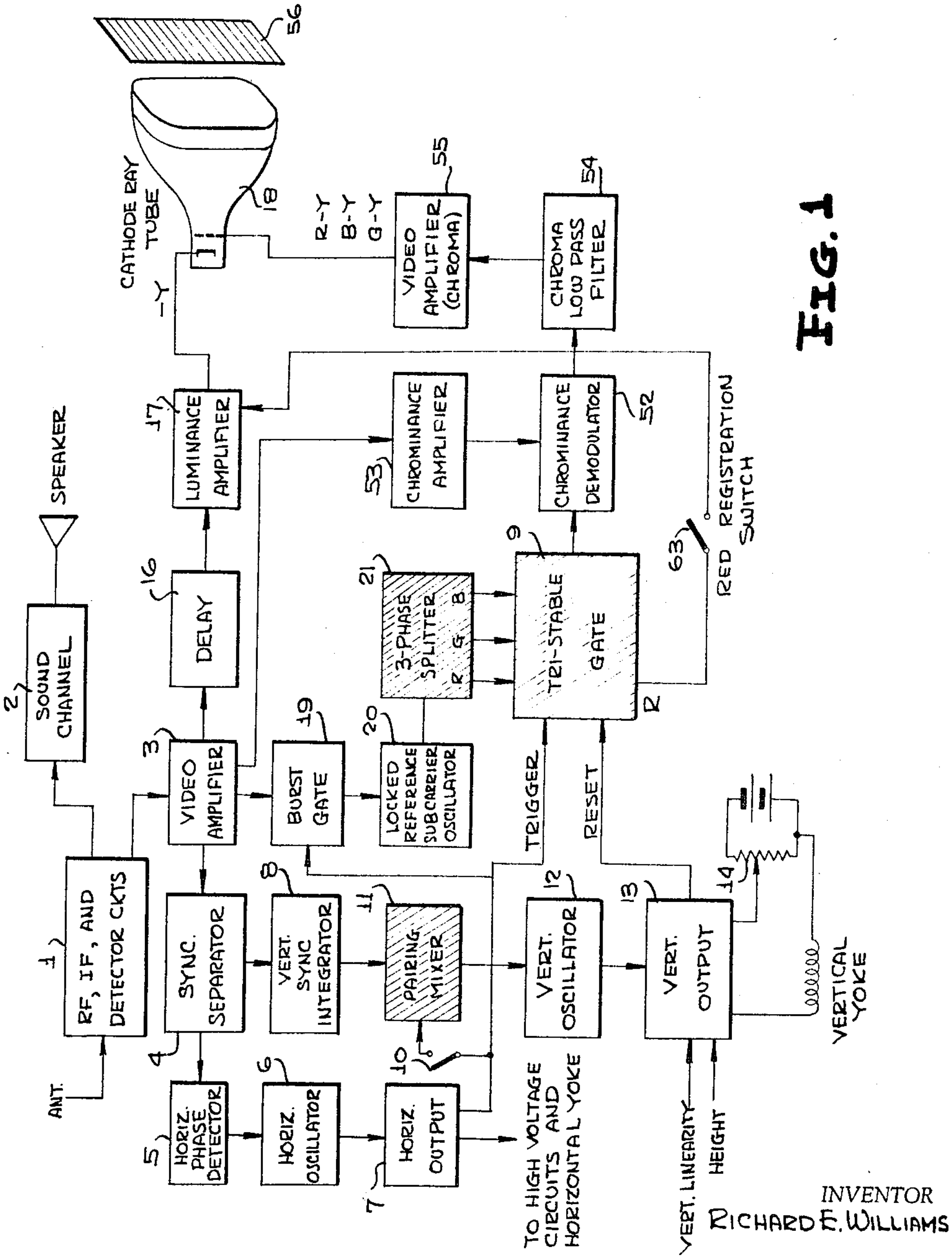
FIGURE 1 is a block diagram of a television receiver employing color display devices according to the invention.

Referring now more specifically to FIGURE 1, a block diagram of a color television receiving and display system employing elements of the present invention is provided. Elements essentially conventional to a TV receiver are shown unshaded and elements intimately related to this invention are shown shaded. A television signal assumed to be in accordance with present FCC television standards is received at an antenna and processed through conventional RF, IF, and detector circuits 1 at whose output the sound is extracted via a sound channel 2 and video signals are extracted by a video amplifier 3. The signal observed at the video amplifier 3 contains luminance information, chrominance information, subcarrier burst information, vertical and horizontal blanking pedestals, synchronization impulses, etc. The composite signal at this point is that which would be observed in any properly operating television receiver. The horizontal and vertical synchronization impulses are extracted by means of a sync separator 4 and separated into vertical and horizontal synchronization channels. The horizontal channel consisting of a horizontal phase detector 5, the horizontal oscillator 6, and a horizontal output stage 7 is substantially conventional except that a sharp positive pulse synchronized with the horizontal retrace is taken from the horizontal output stage to energize a subcarrier burst gate and to be combined with a vertical sync pulse extracted from the vertical sync integrator 8. Additionally that pulse is used as a trigger for a tri-stable gate 9 to be described later.

As is well known the standard FCC television signal employs interlaced scanning; that is, successive *fields* consist of only even lines, only odd lines, etc., to result in a 525 line interlaced *frame*.

Each field has 262½ lines. The present invention uses horizontal line synchronization pulses to select primary color excitations, and complexities resulting from interlaced scanning are eliminated by intentionally overcoming the interlacing process.

In order to effect interlaced scanning the transmitted signal locates alternate vertical pulses either directly on horizontal synchronization pulses or else midway between successive horizontal synchronization pulses. A conventional vertical synchronization integrator and triggered oscillator will tend to trigger the vertical sweep alternately at the beginning of a horizontal line and at the center of a horizontal line. If all of the parameters of the synchronization circuits remain constant, the raster produced is interlaced, as is well known to the art.

It also is well known in the art that the vertical synchronization pulse is serrated at a rate twice that of the horizontal synchronization frequency and additionally is preceded and followed by equalization pulses at twice the horizontal frequency rate. This double-frequency modification is employed to insure similar vertical rise time conditions on both even and odd fields. If, however, pulses derived from the horizontal oscillator are added to the vertical synchronization pulse the double frequency equalization is overcome and the vertical oscillator tends to synchronize always at the beginning of a horizontal line. The horizontal oscillator "flywheels" at the fundamental horizontal frequency and ignores equalization pulses. Hence it is possible to obtain line pairing by introducing components of the horizontal synchronization following the flywheel action. In FIGURE 1 the component is derived from the horizontal output stage 7 and is controllably added to the vertical sync integrator 8 output by means of a switch 10 and a pairing mixer 11. The switch 10 is normally closed only when the receiver control is turned to the "color" function. If the switch 10 were left closed during receipt of black and white transmissions successive fields would be paired and a slightly coarser line structure would be seen. As a practical matter my investigations of commercial receivers has shown that partial pairing implicity occurs in the vast majority of receivers in the home and that pairing is quite hard to discern. Accordingly it is not *essential* that the switch be provided since continuous circuit closure results in very little degradation of black and white signals.

The vertical oscillator 12 is of the conventional type and is triggered only when the incoming synchronization signal exceeds a threshold. The amplitude of the horizontal synchronization pulses derived from the horizontal output stage 7 is adjusted in amplitude by means of a resistive or capacitive attenuator (not shown) so as to be inadequate for firing the vertical oscillator 12 unless combined with the vertical synchronization pulse derived from the vertical sync integrator 8. When firing of the vertical oscillator 12 occurs it is coarsely in synchronization with the vertical synchronization pulse and precisely in vertical-sync with the selected horizontal pulse. Since the horizontal synchronization pulse is fixed relative to the beginning of a horizontal line, successive fields are paired, reducing the line structure of the raster from 525 down to 262½ lines. As a result of pairing fields in this fashion each field can be treated as identical insofar as synchronizations, resolutions, etc. are concerned.

Figure 2:
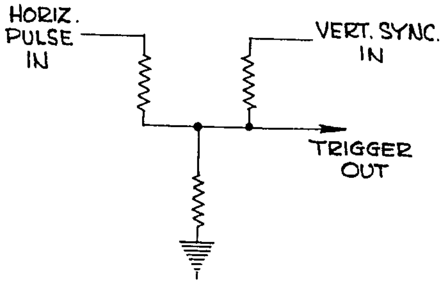
FIGURE 2 is the diagram of a linear mixer usable for a line pairing function.
Figure 3:
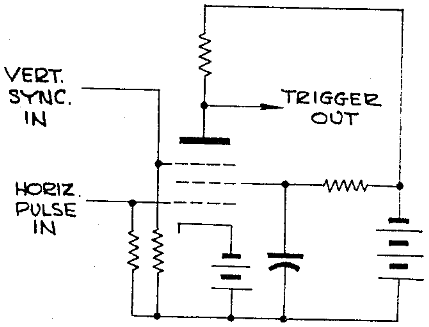
FIGURE 3 is a non-linear mixer suitable for line pairing and demodulation functions.

The pairing mixer 11 can take forms ranging from the simple resistive adder of FIGURE 2 to the tube mixer of FIGURE 3. Both circuits are well known to the art and differ only in that the first provides a trigger which is the sum of the horizontal and vertical pulses (linear) whereas the second provides a trigger proportional to their product (non-linear). Additional mixer circuits of both linear and non-linear types are well known.

The display fields which have been prepared through the process of pairing are transmitted to the vertical yoke via the vertical output stage 13 and a vertical positioning control 14. The control 14 enables adjustment of the center of the vertical field to a fixed position. Since merely the center of the field is fixed, adjustments of vertical linearity and height in the usual manner tend to merely extend or compress the field relative to the fixed point. As will later be shown this arrangement makes for ease of color registration adjustments.

Having arranged the raster, or line structure, in a form suitable for processing it is next necessary to process the chrominance information so as to obtain proper registration of colors. The output of the video amplifier 3 is transmitted through a delay line 16 and a luminance amplifer 17 to a control element such as the cathode of the cathode-ray-tube 18. In black and white reception and display this is the normal processing of the signal, and with the exception of the delay 16 to compensate for chrominance delays it takes a completely conventional form. The bandwidth of the luminance channel represented by the video amplifier 3, delay circuit 16, and luminance amplifier 17 is in the order of 3.2 megacycles.

In the presence of a crominance signal the 3.58 megacycle reference burst which appears on each horizontal pedestal is extracted in conventional form by means of a burst gate 19 controlled by a signal from the horizontal output stage 7. The output of the burst gate 19 locks a referenced subcarrier oscillator 20 at the 3.58 megacycle reference frequency in a manner well known to the art. The locked reference oscillator can consist either of a crystal ringout circuit or a phase and frequency controlled oscillator. Neither is described here because they are well known and represent standard practice in color receiver design. The output of the locked reference oscillator 20 consists of a phase locked 3.58 megacycle subcarrier having a phase along the red (R) axis of the vector diagram of FIGURE 4. The vectors of FIGURE 4 represent the 3.58 megacycle phases assumed by the three additive primaries red, blue, and green respectively.

Figure 4:
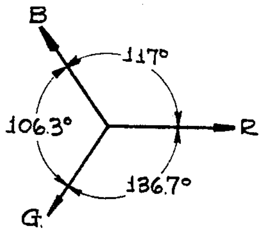
FIGURE 4 is a phase vector diagram of chrominance information.

The three-phase splitter 21 of FIGURE 1 splits the output of the locked reference subcarrier oscillator 20 into three components having the respective phases of FIGURE 4. It is well known that errors of approximately 10° can be tolerated in the phase angles of the three primary colors and thus the phase angles can vary that amount about the values shown in FIGURE 4. A typical configuration for the three-phase splitter 21 is that of FIGURE 5 in which it is seen that 0° and 180° components of the 3.58 megacycle subcarrier oscillator output are shifted in phase by RC combinations to yield the phase angles of FIGURE 4. The circuit shown is not novel and is merely one of several that are usable for the three-phase splitter 21. A tapped delay line is also effective as a means of obtaining the three phases.

The output of the three-phase splitter 21 consists of three components each at the frequency of the reference subcarrier oscillator, 3.58 megacycles, yet each having a relative phase indicated by the vectors of FIGURE 4. For convenience the three output signals are labeled R, B, and G corresponding to the phases represented by red, blue, and green chrominance signals respectively.

Figure 6:
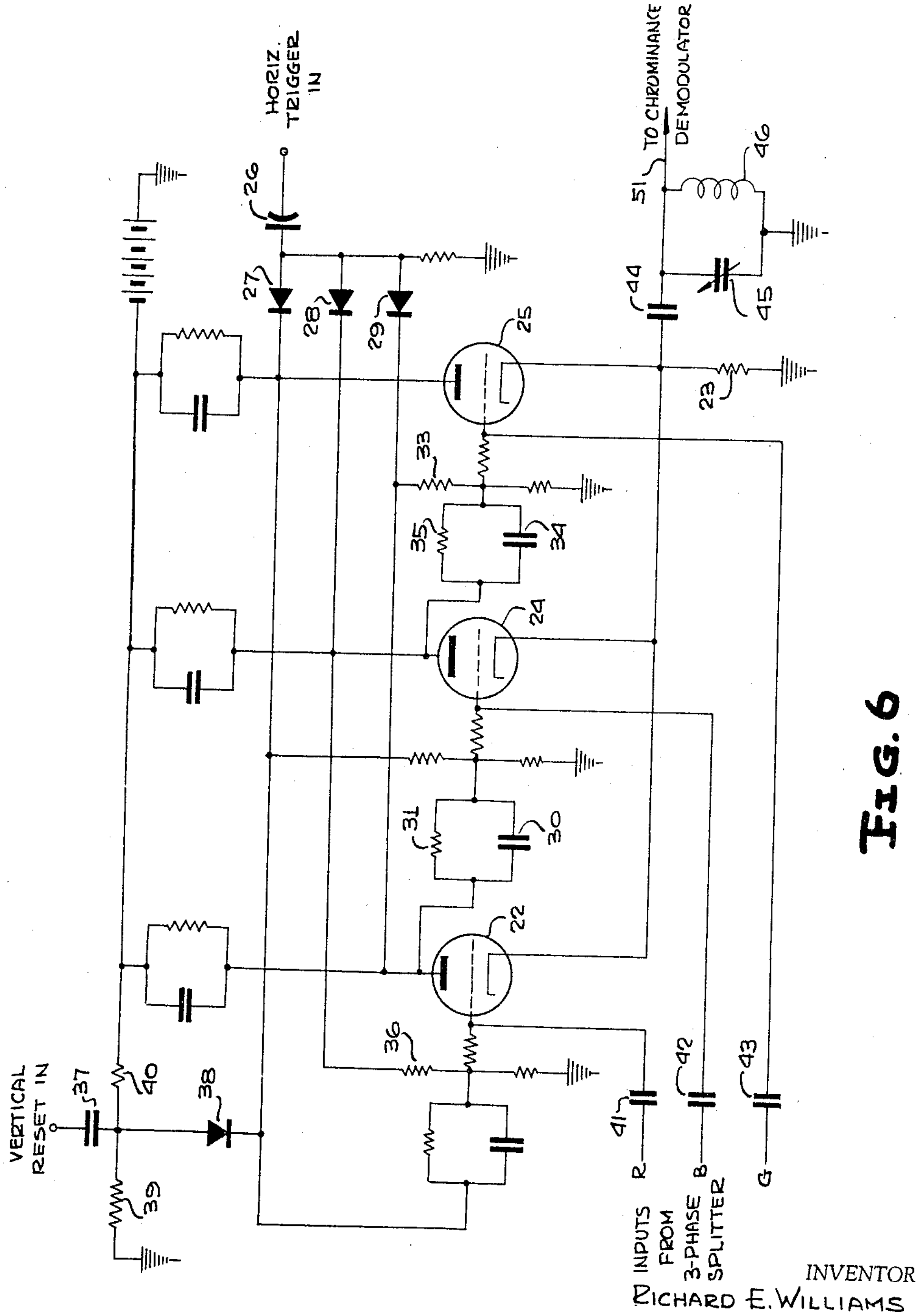
FIGURE 6 is the diagram of a tri-stable gate.

As a next step in the present invention the three reference signals are sequentially sampled in a fashion that will enable a first horizontal line on the display raster to display red information, a second horizontal line to display blue, the third to display green, the fourth to display red, etc. The tri-stable gate 9 of FIGURE 1 should thus take the form of a single-pole triple-throw switch with a commutation rate synchronized to the line frequency and additionally synchronized so that color assignments to lines on successive fields are identical. The tri-stable gate circuit 9 thus essentially consists of a three-stage ring counter, clocked by the horizontal synchronization pulses, reset to an initial state by each vertical pulse, and connected to gate the three inputs from the three-phase splitter 21 in iterative sequences. FIGURE 6 is a diagram of a circuit capable of performing these functions.

The tri-stable gate of FIGURE 6 must satisfy the requirement that only one triode conduct during a line interval and additionally that the conduction of triodes occurs in an orderly sequence. In the circuit of FIGURE 6 the triodes act not only as stages of a ring-of-three counter, but also implicitly act as gates since the 3.58 megacycle gated signal can be frequency discriminated from the switching frequency components. When the tri-stable gate is initially energized, implicit unbalances cause one of the three triodes to conduct somewhat more heavily than either of the remaining two triodes. Assume that the conducting triode is the tube 22. Its plate is dc coupled to the grids of triodes 24, 25, so as to draw them negative. Simultaneously a common cathode resistor 23 tends to increase the regenerative action so that a steady state is reached in which triode 22 is conducting heavily and triodes 24 and 25 are completely cut of. The circuit will remain in this steady state as long as the operating potentials are maintained. Upon the arrival of a positive horizontal trigger via capacitor 26 and diodes 27, 28, and 29 all plates attempt to go positive. Since the plates of triodes 24 and 25 are already at their most positive D.C. potentials the only plate capable of appreciably rising in potential is that of triode 22. This positive-going potential is coupled via capacitor 30 and resistor 31 and a much smaller resistor 32 to the grid of triode 24. The grid of triode 24 thus rapidly commences a positive swing. Some of the rise in plate potential of triode 22 is also coupled via resistor 33 to the grid of triode 25 but this is substantially overcome by the drop in plate potential of triode 24 coupled to the same grid via capacitor 34 and resistor 35. It is thus the case that triode 24 will assume heavy conduction, triode 25 *remains* cut off, and triode 22 *becomes* cut off because the descending plate of triode 24 is coupled to the grid of triode 22 by resistor 36 and additionally regenerative action takes place in the common cathode resistor 23. In essence the application of a positive pulse derived from the horizontal circuit served to transfer conduction from the first triode 22 to the second triode 24. The application of another pulse transfers conduction from triode 24 to 25, and so on, in processes identical to those just described. The circuit is balanced and thus pursues the count of three indefinitely as horizontal trigger pulses cock it. After approximately 262 horizontal trigger pulses have arrived via capacitor 26 a positive vertical reset pulse is received via capacitor 37 from the vertical sweep channel as shown in FIGURE 1. The latter pulse is coupled through diode 38 of FIGURE 6 to the grid of triode 22 causing the triode to go into strong conduction and "capture" the tri-stable circuit. This is in effect a reset function that takes place at the beginning of each new vertical field. Resistors 39 and 40 serve to prevent the diode 38 from unbalancing the tri-stable circuit under normal operation. The diode is implicitly back-biased until a vertical pulse is received.

Figure 5:
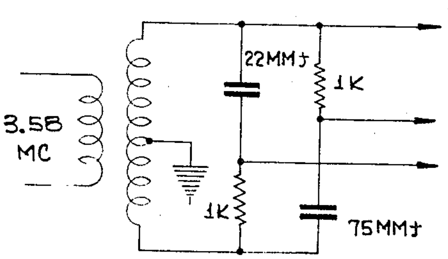
FIGURE 5 is a diagram of a 3.58 megacycle three-phase splitter.

The three inputs from the three-phase spliter derived, for example, from the output leads R, B, and G of FIGURE 5 are coupled via capacitors 41, 42, and 43 to the respective grids of the tri-stable gate. Since only a single triode is conducting at a time the 3.58 megacycle component observed at the common cathode resistor 23 is that which had been transmitted by the conducting triode. This component is coupled via capacitor 44 to a tuned resonance circuit consisting of a capacitor 45 and inductance 46 which extracts the 3.58 megacycle frequency and rejects D.C. components of the output signal.

Figure 7:
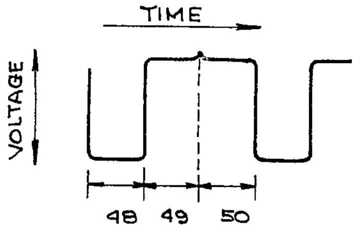
FIGURE 7 is a plate waveform of a triode in a tri-stable gate.
Figure 8:
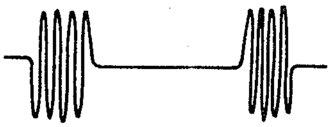
FIGURE 8 illustrates 3.58 megacycles reference samples derived from a single stage of the tri-stable gate.

If one were to look at the plate of a single triode 22, the waveform of FIGURE 7 would be observed. The time interval 48 corresponds to conduction of the triode and the time intervals 49 and 50 correspond to cutoff conditions during the ring cyclic action. Triode 22 can transmit only while conducting and therefore it produces at the resonant circuit 45, 46 clearly defined bursts as shown in FIGURE 8. Such bursts would be observed if only the red input were connected to the tri-stable gate. When the blue and green inputs are connected the waveform of FIGURE 8 is filled in, with only phase perturbations to show where triodes exchange conduction. One then has at the output of the tri-stable gate components at 3.58 megacycles having phases indicated by the vectors of FIGURE 4 commutating at the horizontal line rate. Additionally whenever a vertical reset pulse is received the output resets itself to commence with the red phase in the manner described.

The tri-stable gate of FIGURE 6 has certain advantages of simplicity but is not the only circuit that will suffice for the phase sequencing operation. A pair of flip-flop circuits permuted to a count of three and a group of diode gates, for example, would perform the function adequately. The circuit shown is intended to be exemplary only and is merely indicative of the manner in which the multiplexing is accomplished. As is well known the horizontal line frequency under FCC standards is 15,750 c.p.s. The tri-stable gate thus steps at that rate and dwells for approximately 63 microseconds in each conducting state. The frequency components of interest in the multiplexing operation do not extend appreciably above 150 kilocycles and thus are satisfactorily suppressed by the tank circuit consisting of capacitor 45 and inductance 46, FIGURE 6. It is additionally the case that the major perturbations relating to the exchange of conduction in the tri-stable circuit occur either during horizontal retrace on the CRT raster or else during the horizontal blanking interval. There are accordingly no deleterious effects observed in the sampling procedure.

Returning to FIGURE 1 the phase-multiplexed 3.58 megacycle reference frequency is supplied to a chrominance demodulator 52. The demodulator 52 is also supplied with the chrominance information derived from the video signal via chrominance amplifier 53. The chrominance amplifier 53 conventionally amplifies the 3.58 megacycle component of the video signal and has an overall bandpass characteristic extending for approximately ±600 kilocycles around this frequency. The chrominance demodulator 52 is merely a mixer circuit and can take the form of a diode, a pentagrid converter, a triode mixer, etc. Such circuits are well known and accordingly are not shown. When the demodulator 52 is supplied with a specific phase at 3.58 megacycles from the tri-stable gate 9, and a component of the video signal that is matched in phase, it acts as a synchronous demodulator and provides a maximum output. Phase discrepancies between the sample derived from the tri-stable gate and that attained from the chrominance amplifier 53 produce proportional reductions in output. The outputs from the tri-stable gate 9 are constant in amplitude and thus the output amplitudes from the chrominance demodulator 52 are also dependent upon the amplitudes (saturation) of the appropriate signal components received from the chrominance amplifier 53. The nature of the transmitted color television signal is such that the outputs of the chrominance demoduator 52 will take the form of color signals minus the luminance signal. If Y is considered to be the luminance signal the outputs in succession will be R—Y, B—Y, and G-YY. It is necessary to add the luminance signal, Y, to the chrominance demodulator 52 output to obtain the desired additive primaries, red, blue, and green. The addition can be performed in a matrix or it can be performed in the cathode-ray-tube as shown in FIGURE 1. A chroma low-pass filter 54 is followed by a chroma video amplifier 55 which feeds the grid of the cathode-ray-tube 18. The bandwidths of these circuits accommodate the desired chroma bandwidth, typically up to one megacycle or so. Since the output of the luminance amplifier 17 is shown applied to the cathode it is given the negative sign, —Y. The addition that takes place in the cathode-ray-tube yields the additive primaries red, blue, and green in iterative sequences by horizontal lines as discussed earlier.

In one embodiment of my invention the cathode-ray-tube 18 is of the conventional black and white type. When color signals are to be displayed a transparent mask 56 is superimposed over the face of the tube so as to appropriately color successive horizontal lines. If the cathode-ray-tube 18 is provided with a P4 phosphor, I find that the additive primary colors are effectively generated through the use of a Wratten #26 filter for red, #47 filter for blue, and #58 filter for green.

Figure 9:
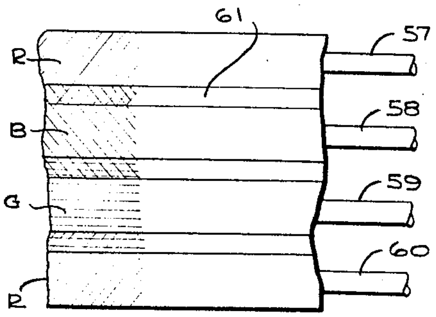
FIGURE 9 is a detail of a color mask sector.

Upon close examination of a portion of the mask 56 horizontal striae such as those of FIGURE 9 are observed. It is seen that successive horizontal raster lines 57, 58, 59, and 60 are located directly behind mask striae of a single color in each case. Line 57 is behind a red stria, line 58 behind a blue stria, etc. Although not essential, I find that slight overlapping 61 in the printing of color upon the mask improves color purity to some extent. The overlap is opaque because the primaries are additive. In the case of line defocus or misregistration in absence of overlap 61, color purity and saturation is lost. With overlap such raster abberrations lead to loss of brightness. In my experiments to date, find that a slight (25%) overlap 61 is generally desirable.

The color mask 56 of FIGURE 1 can be mechanically swiveled in front of the cathode-ray-tube when needed. In any event its mechanical position should be quite precise during color viewing. Typical accuracy is in the order of 1/32 inch in the vertical dimension for a 21-inch cathode-ray-tube. This accuracy is not difficult to achieve. Horizonal positioning is relatively unimportant.

The mask 56 is preferably closely fitted to the face of the cathode-ray-tube. When this is done parallax errors are minimized and the usable field of view is broadened. In any event the horizontal parallax errors are minor because of the horizontal striae. This situation is preferable under normal viewing conditions since viewers tend to be displaced more widely in horizontal than vertical dimensions.

Adjustment of the raster for proper registration is accomplished by means of a registration switch 63 in FIGURE 1. As was mentioned earlier the waveform present at a plate of a switch 63 in FIGURE 1 couples this waveform to the luminance ampifier 17 so that it appears on the cathode of the cathode-ray-tube 18. Since this waveform is synchronized with a horizontal synchronization pulse it tends to render brilliant every third horizontal line in the raster. If the plate waveform of triode 22 in FIGURE 6 were used it would tend to emphasize those lines corresponding to red striae in the mask. This, then, is the means by which the mask is registered with the raster. When the switch 63 is closed the vertical positioning control 14 of FIGURE 1 is adjusted for proper red registration at the center of the mask. The vertical height and linearity controls are then adjusted so as to extend the registration to the top and bottom of the screen. The process is extremely simple and merely serves to register the raster behind the mask. While red had been discussed as the registration color it is quite evident that any other color would do equally as well provided the appropriate plate of the tri-stable gate 9 were used. This technique of color registration is far simpler than the adjustments required on other color display systems.

Figure 10:
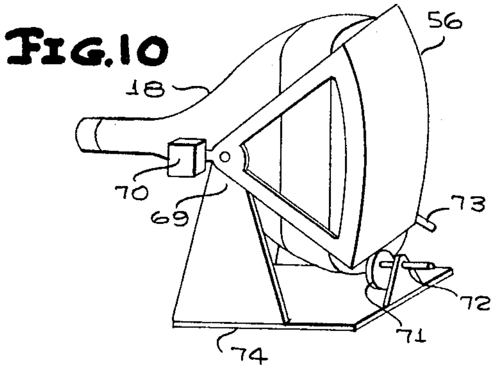
FIGURE 10 is an illustration of a mask and cathode-ray assembly.
Figure 11:
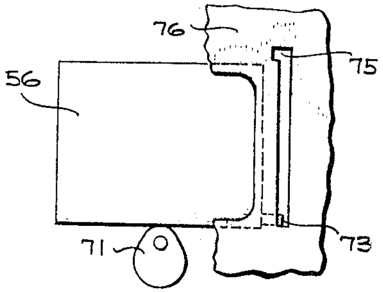
FIGURE 11 shows a method of positioning the mask in front of a cathode ray tube.

The mask can be swiveled as shown in FIGURE 10. The mask 56 is pivoted about a center 69 through the simple process of lifting a stud 73 fixed to the mask 56. A counterweight 70 can be used to minimize the torque required. The mask 56 is shown in the "color" position. In this position an eccentric cam 71 adjusted by means of a shaft 72 may be used in lieu of the vertical positioning control 14 for registration as described above. The eccentric cam 71 serves to slightly adjust the vertical positioning of the mask 56 and is used in the same manner as the vertical positioning control 14. Referring to FIGURE 11 the actuation stud 73, which may be constructed of spring stock, projects through a slot 75 in the front wall of the cabinet 76. When the stud 73 is raised to the top of slot 75 it springs to the left so as to hold the mask 56 in an out-of-the-way position above the cathode-ray-tube. The latter position would be used for monochrome operation. Whenever the mask 56 is returned to the "color" position the eccentric cam 71 acts as a stop that accurately positions it for proper registration.

In a case where phosphor striae are placed upon the faceplate of the CRT exactly the same process of registration can be employed. In the latter case all parallax problems are eliminated.

The will-known "I-Q" demodulation of a color signal can be effected by placing the tri-stable gate 9 at the output of the I-Q demodulation matrix. Merely the chronological order of processes is changed without departing from the spirit of the invention.

Figure 12:
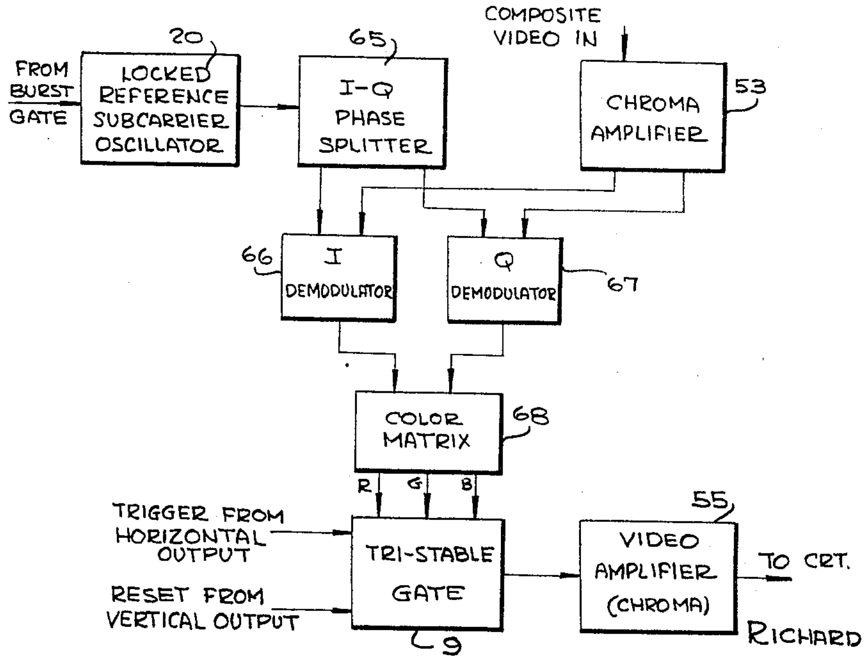
FIGURE 12 is a block diagram of an embodiment of the invention utilizing I-Q demodulation.

Referrring to FIGURE 12, the locked reference subcarrier oscillator 20 of FIGURE 1 is connected to an I-Q phase splitter 65. The I-Q phase splitter 65 is electrically similar to the phase splitter of FIGURE 5, except that only two outputs are obtained therefrom. The outputs, as is well known in I-Q technology, are in quadrature with one another and with the Q-axis 33° displaced from the reference phase axis. It is additionally known that the advantage of I-Q demodulation lies in the somewhat larger chrominance bandwidth that can be attained. The I channel has a bandwidth in excess of 1.3 megacycles while the Q bandwidth is greater than 400 kilocycles.

The output of the chroma amplifier 53 of FIGURE 12 is mixed with the I and Q outputs from the phase splitter 65 in an I demodulator 66 and a Q demodulator 67. The outputs of the demodulators 66 and 67 consists respectively of I chrominance information with a bandwidth in the order of 1.3 megacycles and Q chrominance information with a bandwidth in the order of 400 kilocycles. As is well known to color television art, these two chrominance signals can be combined in a linear matrix 68 to produce red, green and blue chrominance signals as shown. The three-color chrominance signals are then sampled by the tri-stable gate 9 in precisely the horizontal/vertical synchronized fashion described earlier. Since the information sampled by the tri-stable gate 9 is already in demodulated chrominance form it is only necessary to amplify the output of the tri-stable gate in the video amplifier 55 as shown and provide the signal to the cathode-ray-tube in the manner of FIGURE 1. The tri-stable gate in effect samples the colors in sequence. It will be noted that merely the order of the process is changed relative to FIGURE 1. The demodulation precedes rather than follows the tri-stable gate. In other respects the synchronization of the colors with horizontal lines is identical to that described earlier. Similarly, by merely inverting polarities of the roles of the cathode and grid of the cathode-ray-tube of FIGURE 1 can be exchanged. Other such variations are evident and clearly fall within the scope of the basic invention.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A color television receiver for reproducing a moving picture in successive frames, said receiver being responsive to a television signal having simultaneous effective vertical and horizontal sync pulses in alternate fields of each frame and a vertical sync pulse spaced between a pair of horizontal sync pulses in the remaining fields, and simultaneously occurring color signals; comprising a cathode ray tube display system having a plurality of horizontal, parallel strips for emitting primary colors in response to a cathode ray beam, means responsive to said signal for vertically sweeping said cathode ray beam and for concurrently horizontally sweeping said strips, said cathode ray beam having information predominantly of the respective strip color being swept and means responsive to said horizontal and vertical sync pulses for only concurrently triggering the first horizontal sweep and the vertical sweep in all of said fields.

2. A color television receiver for reproducing a moving picture in successive frames, said receiver being responsive to a television signal having simultaneous effective vertical and horizontal sync pulses in alternate fields of each frame and vertical sync pulses spaced between pairs of horizontal sync pulses in the remaining fields, and simultaneously occurring color signals; comprising a monochrome cathode ray tube, a color mask being not more than 275 horizontal, parallel strips for emitting the primary colors when excited by a luminous spot produced by a cathode ray beam of said cathode ray tube, means responsive to said signal for horizontally sweeping said strips with a cathode ray beam having information predominantly of the respective strip color being swept, and means responsive to said horizontal and vertical sync pulses for triggering each of said horizontal sweeps in each of said fields simultaneously with said vertical and horizontal sync pulses in alternate frames and with the first horizontal sync pulse subsequent to a vertical sync pulse in the remaining frames.

3. A color television receiver for reproducing a moving picture in successive frames, said receiver being responsive to a television signal having simultaneous effective vertical and horizontal sync pulses in alternate fields of each frame and a vertical sync pulse spaced between a pair of horizontal sync pulses in the other fields, and simultaneously occurring color signals; comprising a cathode ray tube system having a plurality of horizontal, parallel strips for emitting the primary colors when swept by a cathode ray spot, means responsive to said signal for vertically sweeping said cathode ray spot while horizontally sweeping said strips with said cathode ray spot modulated with information predominately pertaining to the respective strip color being swept, means for obtaining "flywheeled" horizontal trigger pulses from said horizontal sync pulses, means for so combining said vertical sync pulses and said horizontal trigger pulses as to derive repetitive vertical sync control signals having at least a predetermined amplitude only during concomitance of said vertical sync pulses and one of said horizontal trigger pulses, and means responsive said control signals only when said control signal has at least said predetermined amplitude for triggering the vertical sweep of each field, whereby corresponding horizontal lines of successive fields are substantially superposed and the said vertical sync control signals occur only on initiation of a horizontal scan.

4. The receiver of claim 3 wherein said means for triggering the vertical sweep includes a linear mixer responsive to the horizontal trigger pulses and the vertical sync pulses.

5. The receiver of claim 3 wherein said means for triggering the vertical sweep includes a non-linear mixer responsive to the horizontal trigger pulses and the vertical sync pulses.

6. The receiver of claim 3 including means for selectively coupling the horizontal trigger pulses to said means for triggering.

7. A color television receiver for reproducing a moving picture in successive frames, said receiver being responsive to a television signal having simultaneous effective vertical and horizontal sync pulses in alternate fields of each frame, vertical sync pulses spaced between pairs of horizontal pulses in the remaining fields, and simultaneously occurring color signals; comprising a cathode ray tube system having not more than 300 horizontal, parallel strips for emitting the primary colors when excited by a cathode ray spot, means responsive to said signal for horizontally sweeping said strips with said cathode ray while providing said cathode ray beam with information predominantly of the strip color being swept, means responsive to said signal for linearly sweeping area of the same strip with the cathode ray spot during corresponding lines of consecutive fields, and means for initiating each of said fields only concurrently with one of said horizontal sync pulses.

8. A color television receiver for reproducing a moving picture in successive frames, said receiver being responsive to a television signal having simultaneous effective vertical and horizontal sync pulses in alternate fields of each frame, vertical sync pulses spaced between pairs of horizontal sync pulses in the remaining fields, and simultaneously occurring color signals; comprising a cathode ray tube system having a plurality of not more than 300 horizontal, parallel strips for emitting the primary colors when excited by a cathode ray spot, means responsive to said signal for horizontally sweeping said strips with a cathode ray spot having information predominantly of the strip color being swept, means responsive to said signal for sweeping the same strip with the cathode ray spot during consecutive fields, and means for synchronizing the initiation of all of said fields to commence with occurrences of one of said horizontal sync pulses.

9. A color television receiver for reproducing a moving picture in successive frames, said receiver being responsive to a television signal having simultaneous effective vertical and horizontal sync pulses in alternate fields of each frame, vertical sync pulses spaced between pairs of horizontal sync pulses in the other fields, and simultaneously occurring color signals; comprising a display having a plurality of horizontal, parallel strips for emitting the primary colors when excited by a beam of energy, means responsive to said signal for horizontally and colinearly sweeping said strips with a beam of energy carrying information predominantly of the respective strip color being swept, means mixing the horizontal and vertical sync response, means responsive to the means mixing for vertically sweeping the successive fields to overlap the fields so that the same strips in the same order are swept with beam energy during consecutive fields to reproduce a color picture.

10. A color television receiver for reproducing a moving picture in successive frames, said receiver being responsive to a television signal having simultaneous effective vertical and horizontal sync pulses in alternate fields of each frame, vertical sync pulses spaced between pairs of horizontal sync pulses in the other fields, and simultaneously occurring color signals; comprising a display having a plurality of horizontal, parallel strips for emitting the primary colors when excited by a beam of energy, means responsive to said signal for only linearly horizontally sweeping said strips with a beam of energy having information predominantly of the respective strip color, means responsive to said signal for sweeping different areas of the same color strip with said beam of energy during corresponding lines of consecutive fields, and means for initiating all of said fields only concurrently with one of said horizontal sync pulses.

11. The receiver of claim 10 wherein the colors of said strips are only the primary colors, and said strips overlap to a predetermined, but less than complete, extent.

12. The receiver of claim 10 wherein a mask having said strips is included on the outside face of said display, and gating means are provided for sweeping said beam with information predominantly of a single color completely through a field across said display.

13. A color television receiver for reproducing a moving picture in successive frames, said receiver being responsive to a television signal having simultaneous effective vertical and horizontal sync pulses in alternate fields of each frame, vertical sync pulses spaced between pairs of horizontal sync pulses in the other fields, and simultaneously occurring color signals; comprising a cathode ray tube system having a plurality of horizontal, parallel strips for emitting the primary colors when excited by a cathode ray spot, means responsive to said signal for horizontally sweeping said strips with said cathode ray spot while providing said spot with information predominantly of the respective strip color being swept, means for obtaining "flywheeled" horizontal trigger pulses from said horizontal sync pulses, means for combining said vertical sync pulses and said horizontal trigger pulses to derive a control signal always concurrent with one of said horizontal trigger pulses and having at least a predetermined amplitude only during a concomitance of a vertical sync pulse and one of said horizontal trigger pulses, means responsive only to said control signal for triggering the vertical sweep of all said fields, means responsive to said signal for separating the color information into a plurality of discrete signals, each of said discrete signals containing information indicative of a single color, and means responsive to said horizontal trigger pulses for gating said discrete signals one at a time to modulate the intensity of successive horizontal sweeps of the cathode ray beam.

14. The receiver of claim 13 wherein said means for vertical triggering includes means for resetting said means for gating to pass a predetermined one of said discrete signals when said control signal attains said predetermined amplitude simultaneously with the occurrence of a horizontal trigger pulse.

(References on following page)

References Cited by the Examiner

UNITED STATES PATENTS

| | | | |
|---|---|---|---|
| 2,604,534 | 7/1952 | Graham | 178—6.8 |
| 2,723,304 | 11/1955 | Antranikian | 178—5.4 |
| 2,784,342 | 3/1957 | Overbeck | 313—92.5 X |
| 2,923,846 | 2/1960 | Partin | 313—92.5 |
| 2,953,634 | 9/1960 | Court | 178—5.4 |
| 3,147,340 | 9/1964 | Ehrick | 178—5.4 |

OTHER REFERENCES

Engineering Handbook, McGraw-Hill, N.Y., 1957, Fink, D. J., Television TK6642 F5C.2, pages 8–82 to 8–83.

DAVID G. REDINBAUGH, *Primary Examiner.*

ROBERT SEGAL, *Examiner.*

J. A. O'BRIEN, *Assistant Examiner.*